Patented Mar. 13, 1934

1,950,431

UNITED STATES PATENT OFFICE 1,950,431

HALOGEN DERIVATIVE OF ACETYLENE POLYMERS AND PROCESS FOR MAKING SAME

Wallace H. Carothers and Arnold M. Collins, Wilmington, Del., assignors to E. I. du Pont de Nemours & Company, Wilmington, Del., a corporation of Delaware No Drawing. Application October 22, 1930, Serial No. 490,538

34 Claims. (Cl. 260—162)

This invention relates to a new class of organic compounds and the method of their preparation. More particularly, it relates to compounds obtainable from monovinylacetylene by causing it to combine with a hydrogen halide.

Monovinylacetylene was first discovered by Willstatter and Wirth (Berichte, 46, 535) and prepared by exhaustive methylation of 1,4-tetramethyl-diaminobutene-2. More recently, an improved process of preparation has been discovered by Nieuwland who (see his application Serial No. 305,866 filed September 13, 1928) reacts acetylene in the presence of a cuprous catalyst and a nitrogen base to obtain a mixture of acetylene polymers containing monovinylacetylene which may be separated by distillation.

We have discovered that monovinylacetylene, when mixed with a hydrogen halide, will react to yield products not heretofore known, and have isolated and identified these novel products. The compounds obtained by this process from monovinylacetylene comprise the 2-substituted-1,3-butadienes having the formula $CH_2=C(X)—CH=CH_2$ wherein $X$ represents a halogen atom. These compounds may be characterized for descriptive purposes as $\alpha$-vinylvinyl esters of the hydrohalogen acids or as $\beta$-butadienyl halides. They are analogs of isoprene having in their molecules, in place of the methyl group, halogen atoms, and they may be assigned the names fluoroprene, chloroprene, bromoprene and iodoprene, or collectively haloprenes.

Other hydrohalogen addition products of monovinylacetylene are also produced by the process of the present invention and in amounts varying with the conditions and reagents employed as will be explained more fully below. The exact structure of these compounds have not all been determined, but among them are compounds having the general formula: $(X)CH_2—CH=C=CH_2$, wherein $X$ is a halogen atom, represented by chloro-4-butadiene-1,2 and also the dihalogen butenes such as dichlorobutene and dibromobutene. These dihalogen products are formed as byproducts in the preparation of chloro- and bromo-2-butadiene-1,3. Although their structure has not been positively established, there is little doubt that they are one of the two compounds 1,2-dihalogen-butene-2 $(X)CH_2—CX=CH—CH_3$ or 2,4-dihalogen-butene-2 $(CH_3—CX=CH—CH_2X)$.

The preparation of compounds of the type discussed above is described in full below.

*Chloro-2-butadiene-1,3 (and dichlorobutene)*

This compound is readily prepared by causing monovinylacetylene to combine with hydrogen chloride. This combination may be effected under a great variety of conditions and in the complete absence of an added catalyst but it is favorably controlled and accelerated by certain catalysts such as the metal halides. Among twenty-four metal chlorides tested may be mentioned mercuric, mercurous, magnesium, calcium, auric, and cuprous chlorides which are increasingly effective in the order named. The course of the reaction is also favorably affected by the presence of ammonium chloride or a substituted ammonium chloride, exemplified by pyridinium chloride and methyl ammonium chloride. The ammonium chloride or substituted ammonium chloride may be added as such to the acid reaction mixture or alternatively may be formed in situ by the addition of a suitable ammonia compound. The results are essentially the same without the ammonium chloride, however, as it merely slightly increases the yield of chloro-2-butadiene-1,3.

Our present preferred method of preparing chloro-2-butadiene-1,3 consists in shaking or stirring monovinylacetylene with a concentrated aqueous solution of hydrogen chloride containing cuprous chloride and ammonium chloride. This method is illustrated by the following example.

*Example I.*—Fifty grams of cold monovinylacetylene is placed in a pressure bottle containing a thoroughly chilled mixture composed of 175 g. of concentrated hydrochloric acid (sp. gr., 1.19), 25 g. of cuprous chloride, and 10 g. of ammonium chloride. The bottle is closed and shaken until the heat of reaction causes its temperature to rise to about 30° C. This usually requires about 10 minutes. It is then thoroughly cooled by immersing it in iced water (10–15 minutes). It is then removed from the cooling bath and shaken for three hours. The monovinylacetylene is now almost completely converted into chloro-2-butadiene-1,3 and dichlorobutene. The contents of the bottle are poured into a separatory funnel and the dark aqueous layer is drawn off from the supernatant liquid. The latter is washed with saturated aqueous sodium chloride solution and separated. A small amount of hydroquinone, catechol, or pyrogallol is added to it, and it is dried with anhydrous sodium sulfate or calcium chloride. It is then filtered into a distilling flask containing a small amount of hydroquinone, catechol, or pyrogallol and distilled. A very small amount of distillate boiling at 35-55° C. is frequently obtained. This is a mixture of chloro-2-butadiene-1,3 and monovinylacetylene. It may be separated into its components by redistillation. The main fraction boils at 55 to 75° C. It is substantially pure chloro-2-butadiene-1,3. A higher fraction boiling at 75-135° C. is chiefly dichlorobutene-2. It may be purified further by redistillation. In an actual test 1000 g. of monovinylacetylene (in 20 bottles) gave 1560 g. of reaction product which on distillation gave a few drops of 35-55° C. fraction, 1150 g. of 55-75° C. fraction, 200 g. of 75-135° C. fraction.

The chloro-2-butadiene-1,3 (55-75° C.) fraction may be purified further by redistillation to obtain substantially pure chloro-2-butadiene-1,3 boiling at about 61° C. For this purpose we prefer to use a flask provided with a fractionating column and to carry out the distillation under diminished pressure (100-500 mm.) and in a current of inert gas such as carbon dioxide or nitrogen.

Various factors in the above process may of course be modified or changed without affecting the essential result, the formation of chloro-2-butadiene-1,3 and dichlorobutene. Thus, instead of separating the crude reaction product from the reaction mixture by mechanical means the separation may be effected by steam distilling the entire reaction mixture. The reaction may be run at higher or lower temperatures. The concentration or the amount of the hydrochloric acid may also be increased or diminished although the preferred range of concentration lies above 15% by weight of HCl based on the water present in the mixture. However, the pressure at which the reaction is carried out will of course influence the concentration of acid desirable. The concentration and the nature of the catalyst may also be changed.

The ratios of unchanged monovinylacetylene, chloro-2-butadiene-1,3 and dichlorobutene-2 in the product are, however, considerably affected by changes in some of these factors. Thus, by increasing the amount and concentration of the hydrochloric acid the proportion of dichlorobutene may be greatly increased. If the cuprous chloride catalyst is omitted, or if a less powerful catalyst is used, considerable amounts of an isomer of chloro-2-butadiene-1,3 are formed as described more fully below. The particular set of conditions described above, however, has given the largest yield of chloro-2-butadiene-1,3.

The addition of an antioxidant such as hydroquinone, catechol, or pyrogallol to the crude chloro-2-butadiene-1,3 before distillation is an important feature of the above process. These materials, and such materials as trinitrobenzene, iodine, diphenyl guanidine and m-tolyulenediamine, inhibit the loss of chloro-2-butadiene-1,3 by polymerization during the drying and distillation. Other antioxidants may be used for this purpose, but these have been selected from a long list of tested materials as among the most effective.

The combination of monovinylacetylene and hydrogen chloride may also be effected in continuous fashion by filling a vessel with a catalyst solution of the type described in Example I and introducing the monovinylacetylene in gaseous form in fine bubbles. The resulting crude chloro-2-butadiene-1,3 rises to the surface of the solution where it is collected or allowed to overflow into a container. In order to maintain the proper proportions, hydrogen chloride is continuously introduced, either in admixture with the gaseous monovinylacetylene or as a separate stream.

We have also carried out the combination of aqueous hydrochloric acid with monovinylacetylene in the presence of cuprous chloride in a jacketed autoclave provided with a stirrer. In using this method it has been found advantageous to add the hydrochloric acid—cuprous chloride mixture to the monovinylacetylene and to keep the temperature of the reaction mixture in the neighborhood of 25° C.

As appears from the above discussion, chloro-2-butadiene-1,3 is formed by the action of aqueous hydrochloric acid on monovinylacetylene either in the presence or absence of a metallic chloride catalyst. It has been found that hydrogen chloride also combines with monovinylacetylene in solution, such, for example, as an ethereal solution both in the presence and absence of a catalyst.

Chloro-2-butadiene-1,3 may be described as a colorless, mobile liquid having a characteristic odor somewhat resembling that of ethyl bromide, insoluble in water and miscible with the common organic solvents. It has a boiling point of about 61° C. at 760 mm. pressure, a density at 20° C. of about 0.957-8 and a refractive index of 1.458. It polymerizes spontaneously and very rapidly to form an exceedingly strong, tough, transparent, elastic mass resembling natural rubber. This polymerization may be inhibited, however, by the addition of certain anti-catalysts as already mentioned above.

Dichlorobutene, formed as a byproduct in the preparation of chloro-2-butadiene-1,3 is a colorless liquid having a boiling point of 128° C. at 760 mm. and at 20° C. a specific gravity of 1.161 and a refractive index of 1.479. It is insoluble in water and miscible with most organic solvents and is stable, showing no tendency to polymerize as does chloro-2-butadiene-1,3.

*Chloro-4-butadiene-1,2*

As already indicated, hydrogen chloride in concentrated aqueous solution combines with monovinylacetylene fairly rapidly, even when no catalyst is present, to form chloro-2-butadiene-1,3. When cuprous chloride is used as a catalyst the reaction is greatly accelerated and the products formed are largely chloro-2-butadiene-1,3 and dichlorobutene-2, and the latter results from the addition of hydrogen chloride to the chloro-2-butadiene-1,3. But when no catalyst is employed or when the less effective catalysts are employed an isomeric compound chloro-4-butadiene-1,2 is formed in increasing amounts. Thus, by the selection of a suitable catalyst the isomeric compound can be made the major product. In an experiment in which calcium chloride was used as a catalyst only 23% of the distillable product was composed of chloro-2-butadiene-1,3 while 61% was composed of the isomeric compound chloro-4-butadiene-1,2; and the dihydrochloride present was contained in a mixture from which no individual could be separated. The use of calcium chloride to increase the yield of chloro-4-butadiene-1,2 is illustrated by the following example:

*Example II.*—In each of 20 bottles were placed 175 g. of concentrated hydrochloric acid, 25 g. of calcium chloride and 50 g. of monovinylacetylene. The bottles were closed and shaken continuously for 5 hours, the supernatant oily layers were drawn off and combined, washed with water, stabilized with pyrogallol, dried with anhydrous calcium chloride, and distilled through a long column. The fractions collected were: (1) 74 g. at 30–55° C., (2) 222 g. at 50–75° C., (3) 576 g. at 80–95° C., (4) 77 g. at 95–120° C., (5) 123 g., residue. Fraction (2) was chiefly chloro-2-butadiene-1,3. Fraction (3) was chiefly chloro-4-butadiene-1,2. On redistillation it yielded 446 g. of pure product.

This compound has a boiling point of 86–88° C., a refractive index of about 1.475 at 20° C. and specific gravity of about 0.991.

*Bromo-2-butadiene-1,3 (and dibromobutene)*

A preferred method for the preparation of this compound is illustrated by the following example. The process, as will be seen, is in general analogous to the preparation of the corresponding chloro-product. The same catalysts and general methods may be used and the observations made in connection with the preparation of the corresponding chlorine product, as to possible variations in the preferred conditions and catalysts, apply.

*Example III.*—Fifty two grams of monovinylacetylene is placed in a pressure bottle together with 185 cc. of concentrated hydrobromic acid (approximately 11 normal) and 35 g. of cuprous bromide, and the bottle is closed and shaken vigorously for 6 hours or longer. The aqueous solution is then separated from the oily layer and the latter is washed with water, stabilized with catechol, and distilled preferably under diminished pressure in a current of nitrogen or carbon dioxide. The fractions collected are; bromo-2-butadiene-1,3 boiling at 38–40° C. at 155–165 mm. (about 32 g.), and dibromobutene boiling at 88–92° C. at 56–60 mm. (about 48 g.). Each of these fractions may be purified further by redistillation.

Bromo-2-butadiene-1,3 polymerizes somewhat more slowly than chloro-2-butadiene-1,3. The polymerization is held back by such materials as solvents, catechol, pyrogallol, etc. It has a boiling point of from 42–43° C. at 165 mm. pressure, density of about 1.402 at 20° C. and a refractive index of about 1.501.

Dibromobutene, formed as a byproduct in the preparation of bromo-2-butadiene-1,3 as described above, has a boiling point of from 56–59° C. at 6 mm. pressure, a refractive index of about 1.554 at 20° C. and a specific gravity of about 1.868.

Obviously, bromo-4-butadiene-1,2 may be prepared by methods analogous to those disclosed for the preparation of the corresponding chlorocompound.

As will be evident from the above, we have discovered a new class of compounds comprising the hydrohalogen addition products of monovinylacetylene and developed simple and practical methods of making the same by treating monovinylacetylene with hydrochloric or hydrobromic acid. Hydrofluoric acid also reacts vigorously with monovinylacetylene.

No compounds of the class herein disclosed have hitherto been described, nor have any feasible methods for their preparation been known. We have identified, and studied representatives of this novel class and have found that they possess unusual and valuable properties. This is especially true of the two halogen 1,3 butadienes which are distinguished by the extraordinary ease and spontaniety with which they polymerize to transparent strong tough elastic masses. The course of their polymerization is susceptible to control by suitable regulation of the conditions under which it is allowed to occur, so that one may obtain at will polymeric mixtures of diverse kinds such as, for example, readily distillable odorous liquids, thick transparent jellies, sticky adhesive elastic bodies, and very hard strong tough masses. Moreover, the compounds of this class exhibit a high degree of reactivity toward a variety of chemical reagents, and they may be converted into many useful and valuable products by reactions not involving polymerization. These modifications are, however, not the subject of the present invention which relates to the products as originally obtained and their preparation.

We claim:

1. An addition product obtainable by reacting monovinylacetylene and a hydrogen halide.

2. A product having the formula

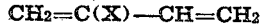

wherein X represents chlorine or bromine.

3. An addition product obtainable by reacting monovinylacetylene and hydrochloric acid.

4. As a new product, a colorless mobile liquid, insoluble in water, miscible with organic solvents boiling at about 61° C. at 760 mm. pressure and having the formula

said product being substantially free of impurities.

5. A product having the formula

6. A product having the formula:

7. The process of preparing a new product which comprises reacting a hydrogen halide with monovinylacetylene, the halide being present in such concentration as to form an addition compound.

8. The process of claim 7 wherein the reaction is carried out in the presence of a reaction catalyst containing a metal ion of the group consisting of cuprous, auric, calcium, magnesium, mercurous and mercuric ions.

9. The process of preparing a new product which comprises reacting a hydrogen halide of the group consisting of HCl and HBr with monovinylacetylene, the hydrogen halide being present in such concentration as to form an addition compound.

10. The process of claim 9 wherein substantially concentrated acid is employed in the presence of a metal halide of the group consisting of the cuprous, auric, calcium, magnesium, mercurous and mercuric chlorides and bromides.

11. The process of preparing new products which comprises reacting monovinylacetylene with a concentrated solution of a hydrogen halide of the group consisting of HBr and HCl in the presence of a metal halide of the group consisting of the cuprous, auric, calcium, magnesium, mercurous and mercuric chlorides and bromides, and an ammonium compound of the group consisting of ammonium chloride and the substituted ammonium chlorides and bromides.

12. The process of preparing a new product which comprises reacting on monovinylacetylene with hydrochloric acid to form an addition product and separating from the reaction mixture fractions boiling respectively at substantially 61° C., 87° C. and 128° C.

13. The process of preparing new products which comprises reacting on monovinylacetylene with concentrated hydrochloric acid in the presence of a metal halide of the group consisting of auric, calcium, magnesium, mercurous and mercuric halides, adding an antioxidant of the group consisting of hydroquinone, catechol and pyrogallol and separating from the product fractions boiling respectively at substantially 61° C., 87° C. and 128° C.

14. The process of preparing a new product which comprises reacting on monovinylacetylene with concentrated hydrochloric acid in the presence of cuprous chloride and separating from the product fractions boiling respectively at substantially 61° C. and 128° C.

15. The process of preparing new products which comprises reacting on monovinylacetylene with concentrated hydrochloric acid in the presence of cuprous chloride and ammonium chloride adding an antioxidant and separating from the product fractions boiling respectively at substantially 61° C. and 128° C.

16. The process of claim 13 wherein 175 grams of hydrochloric acid (sp. gr. 1.19) are reacted at about 30° C. with substantially 50 grams of monovinylacetylene in the presence of substantially 10 grams of ammonium chloride and 25 grams of cuprous chloride.

17. The process of preparing new products which comprises reacting monovinylacetylene with concentrated HBr and separating from the product fractions boiling at 38–40° C. at 155–165 mm. and 88–92° C. at 55–60 mm. respectively.

18. The process of claim 17 wherein 185 grams of hydrobromic acid (approximately 11 normal) are reacted with substantially 52 grams of monovinylacetylene in the presence of substantially 35 grams of cuprous bromide.

19. An addition product obtainable by reacting an open chain acetylene polymer and a hydrogen halide and containing not over two halogen atoms.

20. An addition product obtainable by reacting an open chain acetylene polymer and hydrogen chloride and containing not over two chlorine atoms.

21. An addition product obtained by reacting an open chain acetylene polymer and a hydrogen halide, said product being in concentrated form.

22. An addition product obtained by reacting an open chain acetylene polymer and hydrogen chloride, said product being in concentrated form.

23. An addition product obtained by reacting monovinylacetylene and hydrochloric acid, said product being in concentrated form.

24. As a new product, a monochlorobutadiene.

25. An addition product obtainable by reacting monovinylacetylene and hydrogen bromide.

26. As a new product, bromo-2-butadiene-1,3.

27. The process which comprises reacting an open chain acetylene polymer with a hydrogen halide.

28. The process which comprises reacting monovinylacetylene with hydrogen chloride.

29. The process of claim 28 in which the reaction is carried out in the presence of a solvent for the monovinylacetylene.

30. The process which comprises reacting an open chain acetylene polymer with a hydrogen halide in the presence of a catalyst for the reaction.

31. The process of preparing new products which comprises reacting monovinylacetylene with a concentrated solution of a hydrogen halide of the group consisting of HBr and HCl in the presence of a metal halide of the group consisting of the cuprous, auric, calcium, magnesium, mercurous and mercuric chlorides and bromides, and an ammonium compound of the group consisting of ammonium halides and substituted ammonium halides.

32. An addition product of monovinylacetylene and a hydrogen halide having the formula $$XCH_2-CH=C=CH_2$$

wherein X represents either chlorine or bromine.

33. A product obtainable by reacting a hydrogen halide of the group consisting of HCl and HBr with monovinylacetylene to form an addition compound, said product having the empirical formula $$C_4H_4(HX)_n$$

where X is chlorine or bromine and $n$ is 1 or 2.

34. A process for making 2-chlorobutadiene-1,3 which comprises reacting vinyl acetylene with hydrogen chloride in the presence of a catalyst consisting essentially of cuprous chloride.

WALLACE H. CAROTHERS.
ARNOLD M. COLLINS.